Aug. 13, 1946.   R. A. WALKER   2,405,770
PIVOTAL MOUNTING FOR DAMPER PLATES
Filed April 18, 1945
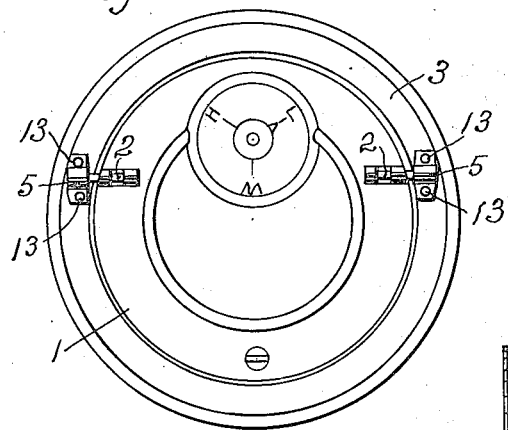
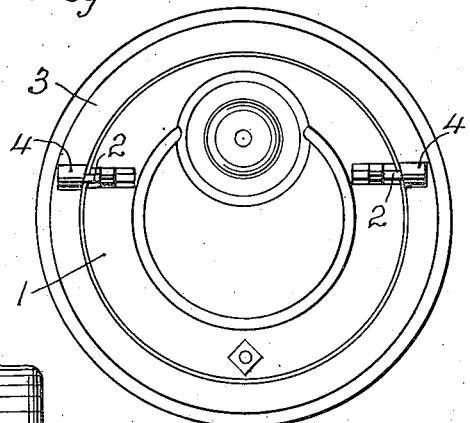
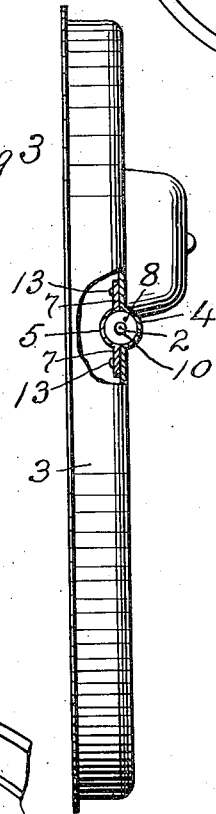
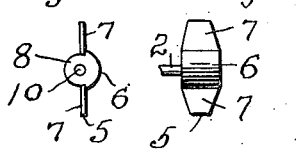
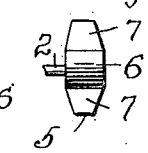
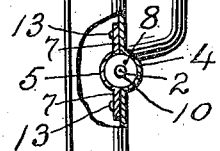
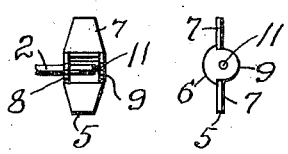
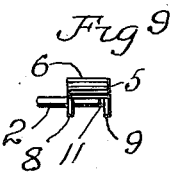
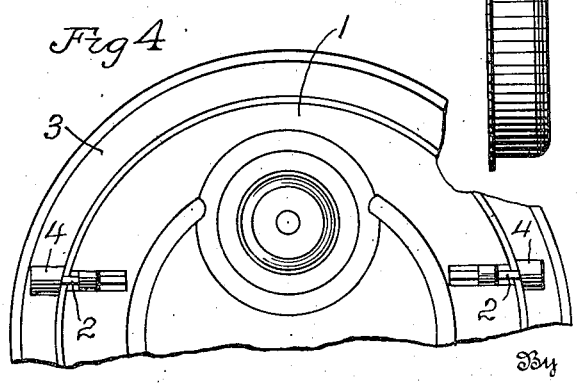
Inventor
Richard A. Walker
Warren D. House
By
His Attorney Patented Aug. 13, 1946

2,405,770

UNITED STATES PATENT OFFICE 2,405,770

PIVOTAL MOUNTING FOR DAMPER PLATES

Richard A. Walker, St. Joseph, Mo.

Application April 18, 1945, Serial No. 588,964

2 Claims. (Cl. 236—45)

My invention relates to improvements in pivotal mountings for damper plates.

One of the objects of my invention is to provide a novel pivotal mounting for damper plates which is simple, strong, durable, not likely to get out of order, which will reliably hold the damper plate from frictional contact with a ring plate which supports it, which permits a free swinging movement of the damper plate, and which protects pintles pivotally supporting the damper plate from the clogging action of soot and other stove pipe or chimney deposits.

A further object of my invention is the provision of a novel pivotal mounting for a damper plate which may be cheaply, easily and quickly adapted for assemblage with axially alined pintles carried by and projecting from opposite edges of a usual damper plate.

The novel features of my invention are hereinafter fully described and claimed.

In the accompanying drawing, which illustrates the preferred embodiment of my invention, Fig. 1 is a reduced side elevation showing my improvement applied to a damper plate of usual structure.

Fig. 2 is a reduced side elevation of what is shown in Fig. 1, facing the opposite side thereof.

Fig. 3 is a full size edge elevation, partly broken away, of a damper plate provided with my improvement.

Fig. 4 is an enlarged side elevation, partly broken away of what is shown in Fig. 2.

Fig. 5 is an inside elevation of one of the bearing members.

Fig. 6 is a side elevation of what is shown in Fig. 5, showing part of the pintle engaged therewith.

Fig. 7 is an elevation of the side opposite that shown in Fig. 6.

Fig. 8 is an outside edge elevation of one of the bearing members.

Fig. 9 is a top view of what is shown in Fig. 7.

Similar characters of reference designate similar parts in the different views.

1 designates a usual damper plate having fastened to it, spaced above its horizontal damper, two horizontal axially alined pintles 2 respectively projecting from opposite edges of the damper plate.

3 designates a supporting ring plate adapted to be mounted in a stove pipe, not shown, and having in the horizontal plane of the pintles 2 two depressions having their concave sides opposite to and respectively facing the sides of the pintles 2, and designated by the numeral 4.

5 designates generally either of two bearing members, each having an arcuate middle portion 6 from the upper and lower ends of which respectively vertically extend two flat portions 7. From the concave inner side of the arcuate portion 6, of each bearing member 5, transversely extend an inner wall 8 and an outer wall 9 parallel with each other. The inner wall 8 is provided therethrough with a horizontal hole 10, and the outer wall 9 is provided on its inner side with a projection 11 alined with the hole 10, and formed by indenting the outer side of the outer wall 9, as indicated by 12 in Fig. 8.

In assembling the structure, the damper plate 1 is disposed in the ring plate 3, as shown in Fig. 1, with the pintles 2 respectively extended through the holes 10. The flat portions 7 of the bearings 5 are then fastened, as by welding spots 13, Figs. 1 and 3, to a side of the ring plate 3, and so placed that the projections 11 are adapted to bear against the outer ends respectively of the pintles 2, so as to hold the periphery of the damper plate 1 from contact with the ring plate 3. The arcuate middle portion 6 of each bearing member 5 has a depression with its concave side facing the side of the adjacent pintle 2.

In disposing the bearings 5, they are respectively placed opposite to the depressions 4, with the pairs of inner and outer walls 8 and 9 respectively extending into the depressions 4, which with the said walls form two enclosing housings into which respectively extend the pintles 2, thus protecting the pintles from being clogged by soot and other stove pipe or chimney debris.

The two bearing members 5 are alike in structure and use, and may be used interchangeably. When the depressions 4 in the ring plate 3 are at the same side of the ring plate, as shown in the drawing, the bearing members 5 are vertically reversed in position, so that the inner walls 8 and their holes 10 are at the inner side next adjacent to the damper plate 1, so as to receive the pintles 2.

Many modifications of my invention, within the scope of the appended claims, may be made without departing from the spirit of my invention.

What I claim is:

1. In a pivotal mounting for a damper plate having two horizontal axially alined pintles fastened thereto and projecting respectively from opposite edges thereof, in combination, a supporting ring plate in which the damper plate is operatively disposed, said ring plate having in the horizontal plane of said pintles two depressions having their concave sides respectively opposite to and facing the sides of said pintles, and two bearing members each fastened to a side of said ring plate, each member having a depression with its concave side opposite to and facing the side of the adjacent one of said pintles, and having each an inner wall and an outer wall extending transversely across the axis of said pintles, said pairs of walls extending respectively into said ring plate depressions and forming therewith two enclosing housings, each of said inner walls having therethrough an axial hole, said pintles extending through and pivoted respectively in said holes and having their outer ends adapted to bear respectively against the inner sides of said outer walls for holding the periphery of the damper plate from contact with said ring plate.

2. In a pivotal mounting for a damper plate having two horizontal axially alined pintles fastened thereto and projecting respectively from opposite edges thereof, in combination, a supporting ring plate in which the damper plate is operatively disposed, said ring plate having in the horizontal plane of said pintles two depressions having their concave sides respectively opposite to and facing the sides of said pintles, and two bearing members each fastened to a side of the ring plate, each member having a depression with its concave side opposite to and facing the side of the adjacent one of said pintles, and having each an inner wall and an outer wall extending transversely across the axis of said pintles, said pairs of walls extending respectively into said ring plate depressions and forming therewith two enclosing housings, each of said inner walls having therethrough an axial hole, each of said outer walls having an inwardly extending axial projection, said pintles respectively extending through and pivoted in said holes and having their outer ends adapted to bear respectively against said projections for holding the periphery of the damper plate from contact with said ring plate.

RICHARD A. WALKER.